United States Patent [19]

Eckardt

[11] Patent Number: 5,764,716
[45] Date of Patent: Jun. 9, 1998

[54] PROCESS AND APPARATUS FOR GENERATING AN INERTING GAS

[75] Inventor: Bernd Eckardt, Bruchköbel, Germany

[73] Assignee: Siemens Aktiengesellschaft, Munich, Germany

[21] Appl. No.: 779,367

[22] Filed: Jan. 6, 1997

Related U.S. Application Data

[63] Continuation of PCT/DE95/00799, Jun. 20, 1995.

[30] Foreign Application Priority Data

Jul. 4, 1994 [DE] Germany ............... 44 23 400.7

[51] Int. Cl.⁶ ............................................. G21C 9/06
[52] U.S. Cl. .................... 376/279; 376/308; 169/44
[58] Field of Search ............................. 376/277, 279, 376/300, 301, 308; 169/44, 66, 67, 68, 70; 422/244

[56] References Cited

U.S. PATENT DOCUMENTS

| 4,091,874 | 5/1978 | Monma ............... 169/61 |
| 4,601,873 | 7/1986 | Jahn ................. 376/279 |
| 5,093,071 | 3/1992 | Kolditz ............... 376/300 |
| 5,495,511 | 2/1996 | Chakraborty ......... 376/279 |

FOREIGN PATENT DOCUMENTS

| 0070037 | 1/1983 | European Pat. Off. . |
| 0640990 | 3/1995 | European Pat. Off. . |
| 2443255 | 7/1980 | France . |
| 2218578 | 10/1973 | Germany . |
| 2627055 | 1/1977 | Germany . |
| 987190 | 3/1965 | United Kingdom . |
| 2090736 | 7/1982 | United Kingdom . |
| 2202440 | 9/1988 | United Kingdom . |
| 93/09848 | 5/1993 | WIPO . |

OTHER PUBLICATIONS

"Explosionsschutz mit Inn–Coo" (Löcken et al.), cav, Dec. 1989, pp. 75–80.

*Primary Examiner*—Daniel D. Wasil
*Attorney, Agent, or Firm*—Herbert L. Lerner; Laurence A. Greenberg

[57] ABSTRACT

A process for generating an inerting gas for rendering an atmosphere inert, such as within a containment shell of a nuclear power plant. Inert gas is kept in liquid or solid phase in a first reservoir. A sufficient amount of heat to vaporize the liquefied or solidified inert gas is made available in a heat transfer medium in a second reservoir. When inerting gas is needed, the heat transfer medium and the liquefied or solidified inert gas are brought into thermal contact with one another. An apparatus for generating the inerting gas is provided as well. The process and the apparatus are particularly suitable for generating a large amount of inerting gas, as a result of which it can be ensured that the containment shell of a nuclear power plant is rendered inert within a short time.

33 Claims, 6 Drawing Sheets

PROCESS AND APPARATUS FOR GENERATING AN INERTING GAS

CROSS-REFERENCE TO RELATED APPLICATION

This application is a continuation of international application PCT/DE95/00799, filed Jun. 20, 1995, which designated the United States.

BACKGROUND OF THE INVENTION

1. Field of the Invention

The invention relates to a process and an apparatus for generating an inerting gas for feeding into a container, in particular into a containment shell of a nuclear power plant.

There is often provision for containers of industrial plants whose atmosphere may contain combustible, inflammable and explosible substances to be fed with an inerting gas in order to render the atmosphere inert. Particularly in a nuclear power plant, in the event of a breakdown or accident situation, hydrogen gas could be formed in the atmosphere of a containment shell surrounding the reactor core, as a result of the core heating up with oxidation of zirconium. In order to render the atmosphere of the containment shell inert, in particular in order to avoid an explosive gas mixture, which contains hydrogen, for example, as one of the reactive constituents, it is envisaged to feed inerting gas into the containment shell.

2. Description of the Related Art

Various processes and devices for preventing the formation of explosive gas mixtures of this kind in the containment shell of a nuclear power plant have been proposed. These include, for example, devices, such as catalytic recombiners, catalytically and electrically operated ignition devices, a combination of the two above-mentioned devices, permanently or subsequently rendering the atmosphere inert, and also subsequently rendering the atmosphere inert with simultaneous depressurizing of the containment shell.

Inerting processes have also been disclosed in which a liquefied gas can be fed in via branched nozzle systems or conventional gas feed systems having an integrated oil burner or gas burner evaporator plant. Other variants are based on a liquefied gas feed, feeding into a water sump inside the containment shell also being envisaged due to lack of evaporation energy in the atmosphere of a nuclear power plant. However, this means that, depending on the nature of a fault, it is possible that no water sump at all will be present, and that as a result of inert gas being released in the bottom region of the containment shell a considerable thermal stratification and a consequent unfavorable layered distribution of the inerting gas will arise.

German patent disclosure DE 39 27 958 A1 (see U.S. Pat. No. 5,093,071) describes an actively operated apparatus in which oxygen is extracted from the atmosphere of a containment shell and is fed to a combustion engine. The combustion gas formed is fed back to the atmosphere, as a result of which it is intended both that the oxygen concentration be lowered and the atmosphere be rendered inert. However, in the case of this apparatus it must be ensured, during a fault incident, that the combustion engine is able to function, an adequate amount of a combustion fuel is present, and there is protection against an undesired, uncontrolled combustion, which makes the apparatus costly to implement and control.

SUMMARY OF THE INVENTION

It is accordingly an object of the invention to provide a process and an apparatus for generating an inerting gas, which overcomes the above-mentioned disadvantages of the heretofore-known devices and methods of this general type and which allows the production in large amounts of an inerting gas which is particularly suitable for feeding and rendering inert a containment shell of a nuclear power plant, and which is produced in a passive manner.

With the foregoing and other objects in view there is provided, in accordance with the invention, a process for generating an inerting gas, which comprises:

storing a liquid or solid phase inert gas in a first reservoir;

maintaining a sufficient amount of heat for vaporizing the liquid or solid phase inert gas in a heat transfer medium in a second reservoir at a temperature of above 100° C.; and bringing the heat transfer medium and the liquid or solid phase inert gas into thermal contact with one another, for vaporizing the liquid or solid phase inert gas and generating an inerting gas.

In other words, the object of the invention is achieved with a process for generating an inerting gas for feeding into a container, in particular into a containment shell of a nuclear power plant, in that an inert gas is kept in a liquefied or solidified form in a first reservoir, a sufficient amount of heat to vaporize liquefied or solidified inert gas is made available in a heat transfer medium in a second reservoir, and the heat transfer medium and the liquefied or solidified inert gas are brought into thermal contact with one another, a temperature of above 100° C., in the case of a liquid heat transfer medium preferably between 150° C. and 250° C. and in the case of a solid heat transfer medium preferably between 300° C. and 800° C., prevailing in the second reservoir.

This process ensures the generation of a large amount of an inerting gas in a passive manner. This results in a rapid process, which is independent of external supply of energy, for rendering the atmosphere of a containment shell inert by vaporizing liquefied or solidified inerting gas. The inerting gas may in this case be injected continuously under pressure into the atmosphere of the containment shell. It is thus possible to avoid permanently rendering the atmosphere inert, which would impede maintenance and inspection work. The inerting may be activated at short notice and can be employed reliably even when little thermal energy is available in the containment shell. An inerting gas generated by means of the process reduces the risk of a low-temperature shock for components, the problem of small-bore lines freezing and being destroyed, and reliably avoids thermal stratifications with an uneven distribution of the inerting gas inside the containment shell. An appropriate gas temperature control likewise makes it possible to utilize existing passages and lines into the containment shell for feeding in the inerting gas.

The process for generating an inerting gas likewise makes it possible to provide sufficient inerting gas in the event of a fault including complete power failure, so that the atmosphere of the containment shell is filled with, for example, 15–30% by volume of carbon dioxide within a short time, preferably in less than two hours, and as a result partial inerting or dilution, while avoiding rapid deflagrations, or complete inerting is achieved. The amount of vaporized inert gas may be more than 10,000 kg/h. If carbon dioxide is used as the inerting gas, the oxygen content may be reduced to less than 17% by volume in the case of partial inerting and to less than 8% by volume in the case of complete inerting, or to less than 6% by volume if nitrogen is used, so that the risk of an explosion is decisively reduced or excluded, irrespective of the amount of hydrogen gas and of the location where the hydrogen gas is produced. Storing an inerting agent in liquid or solid form in the first reservoir, combined with a second reservoir, for example a high-temperature reservoir for water, makes it possible to realize a compact, continuously available and economic process for rendering a containment shell inert. The rapid generating of large amounts of inerting gas makes it possible to render the atmosphere of a containment shell inert uniformly and irrespective of the fault incident, such that rapid combustion reactions, such as highly turbulent deflagrations or detonations, which may lead to a threat to the containment shell, are essentially avoided.

The transfer of heat from the heat transfer medium to the liquefied or solidified inert gas preferably takes place by bringing the two media into direct contact with one another, which results in direct vaporization of the inert gas. Heat transfer may also take place by means of activatable heat transfer devices, such as for example tubed or plate heat exchangers, jackets, etc. The heat transfer device may be arranged inside the first reservoir or be connected thereto, in which case it is normally isolated from the first reservoir in terms of heat, for example by being emptied or evacuated. In the event of a fault, such an activatable heat transfer device may be filled with the heat transfer medium. A heat transfer device may also be designed as a vacuum insulation with a break or as a heating fluid feed. The inert gas may be brought into thermal contact with the heat transfer medium as a function of the composition of the atmosphere of a containment shell, for example above a certain concentration of hydrogen, or alternatively as a result of other physical characteristic variables of the containment shell, such as the nuclear temperature of a nuclear reactor or the filling level of cooling water of a nuclear reactor.

Carbon dioxide and/or nitrogen is preferably used as the inert gas. These gases can easily be liquefied or solidified in large amounts, for example using known refrigerating installations, and those substances are particularly suitable for rendering an atmosphere containing hydrogen and oxygen inert.

A liquid medium, such as water or an oil, in particular a heat transfer oil, is particularly suitable as the heat transfer medium. These media can easily be brought to a high temperature, in particular above 100° C., and can be held at this high temperature. For this purpose, the second reservoir can have an interposed heat transfer circuit and a permanent heating system. Permanent heating preferably takes place electrically to high temperatures of above 100° C.–300° C. In order to increase the power or to adjust a superheating of the inert gas which is desired from the process technology viewpoint, the second reservoir may also be designed as a high-temperature solid reservoir at temperatures of over 300° C.–800° C. The reservoir may be dimensioned and insulated such that, in the event of a power failure, in particular a failure of the permanent heating system, a heat loss which causes a reduction in the thermal energy stored in the heat transfer medium of less than 10% occurs within a period of 24 h. For a liquid heat transfer medium, in particular water, the second reservoir may be kept particularly small if energy utilization is ensured in a temperature range from, for example, 150° C. down to the freezing range of water of from 0° C. to −10° C.

It is also possible to introduce a solidified inert gas in finely divided form into a liquid heat transfer medium. The solidified inert gas may, for example, be blasted into the liquid heat transfer medium in the form of a particle jet of finely divided ice crystals or ice fragments.

A solid may likewise be used as the heat transfer medium. Metals, such as cast iron or aluminum, and also a ceramic, such as magnesite, are suitable for this purpose. A solid heat transfer medium may be kept continuously at a high temperature and be designed as a fixed bed, comprising pebbles, pellets or other small articles having a high heat exchange surface area, and may be arranged inside a pressure-sealed casing. It is also possible to design a solid heat transfer medium as, for example, a single block with passages running inside the block for the transfer of heat. The solid heat transfer medium is preferably heated electrically to a temperature of about 300° C. to 800° C. As a result, the mass of the solid heat transfer medium and the size of the second reservoir may be kept small. The temperature inside the second reservoir may be evened out using, for example, a circulation fan.

A pourable solid heat transfer medium is preferably used inside the second reservoir. The heat transfer medium may in particular be present in the form of bulk material or as a pebble bed, as a result of which the solid heat transfer medium may also be fed into a liquefied inerting agent of the first reservoir. Direct contact of a liquid inert gas with the solid heat transfer medium makes possible a high heat transfer coefficient with a small volume of the solid heat transfer medium. Direct contact of the solid heat transfer medium with the liquefied or solidified inert gas results in a high outlet temperature, in particular at the start of the process, for vaporized inert gas, which as a result is correspondingly superheated. Liquid inert gas may in turn be introduced into such a superheated inert gas, as a result of which a significant increase in the rate of vaporization is achieved. Liquefied inert gas is fed in a finely dispersed form at an increased speed, so that fine fragmentation with large heat exchange surface areas and rapid vaporization occur.

Heat transfer may also take place via activatable heat transfer devices, such as for example tubed or plate heat exchangers. In this case, a sheathing or insulation of a solid reservoir designed as a solid block may simply be designed as a nonpressure-retaining part. A heat transfer device of this kind can be directly integrated into the solid heat transfer medium and is separated from the liquefied inert gas by a reliable separation means. It is likewise possible to configure the process with an interposed heat transfer circuit, which can normally be evacuated and is filled with a liquefied inert gas at the start of the process.

The first reservoir and/or the second reservoir are preferably operated at a pressure of 5–50 bar, preferably about 20 bar. Pressure generation and limiting inside a reservoir are carried out, for example, by a control valve which is controlled by its own separate medium, a hydraulic control of the pressure or of the heat transfer using heating surfaces, and by means of a flow rate control system, in particular at approximately 20 bar. A liquefied inert gas, for example carbon dioxide, may be held in a pressure range of about 10–50 bar by cooling by means of a refrigerating circuit or, in the event of the first reservoir being positioned inside the containment shell, may also be stored virtually depressurized. Depressurized storage additionally makes it possible to use heat energy stored in the containment shell. Preferably, the first reservoir is held at a temperature of below −10° C. When the inert gas comes into thermal contact with the heat transfer medium, in particular with water, there is thus a particularly great heat transfer. An additional heat transfer is achieved by exploiting the enthalpy of fusion.

The temperature of above 100° C. prevailing in the second reservoir, for example between 150° C. and 250° C. for a liquid heat transfer medium and 300° C. to 800° C. for a solid heat transfer medium, ensures a great heat transfer, and thus the generation of a large amount of inerting gas, when the heat transfer medium comes into thermal contact with the liquefied or solidified inert gas.

The inert gas is preferably heated to a temperature of above −20° C., in particular of above −10° C. This keeps the amount of water vapor in the inerting gas small and reliably avoids the risk of freezing with consequent blockage of lines or nozzles.

A liquid heat transfer medium, which is introduced into a liquefied inert gas, is preferably used. The liquid heat transfer medium is, in particular, sprayed into the liquefied inert gas in finely divided form and/or at a speed of over 10 m/sec. The spraying of the heat transfer medium, in particular heated water, into the liquefied inert gas leads to a spontaneous formation of inerting gas and possibly to direct freezing of the heat transfer medium. Simultaneously feeding in small amounts of nitrogen makes it possible reliably to prevent direct freezing in a region of the feed nozzles. A content of a noncondensable gas, such as for example nitrogen, avoids condensation shocks, as may be formed, for example, when water vapor suddenly condenses.

Mixing the liquefied inert gas with the heat transfer medium, in particular water, as well as simultaneous vaporization of the inert gas, may be carried out by means of a jet pump apparatus. Rapid dispersing and mixing take place owing to the resultant speed differences between the heat transfer medium and the inert gas. The jet pump apparatus is preferably immersed in one of the two liquids. Feeding the heat transfer medium into the liquefied inert gas simultaneously brings about compression of the inerting gas within the first reservoir. By controlling the amount of inert gas vaporized and a corresponding overpressure accordingly, the inerting gas generated may be brought out of the first reservoir purely in the form of a gas or with a small content of liquid, in particular of <0.5%. The pressurized, speedless inerting gas in the first reservoir is accelerated through appropriate lines, in particular nozzles, and is introduced into the containment shell at a high speed. This also applies in a corresponding manner to a process in which a liquefied inert gas is sprayed into a heat transfer medium.

In the case of a process in which liquefied inert gas is sprayed into the heat transfer medium, the inert gas has a speed of, in particular, over 10 m/sec, and is in a finely divided form.

Feeding in the liquefied inert gas at a temperature of, for example, −10° C. to −50° C. ensures effective utilization of the thermal energy of the heat transfer medium, since cooling takes place, for example, down to the freezing range of water, resulting in partial utilization of the enthalpy of fusion. The dispersing resulting from spraying results in the fragmentation of ice on freezing without the formation of large, adhering pieces of ice which endanger the integrity of the second reservoir. Using a countercurrent heat exchanger additionally provides greater utilization of the thermal energy of the heat transfer medium, since, in an inlet region of the liquefied inert gas, freezing takes place even as early as below, for example, −10° C., with suitable additives, and, in an outlet region of the inerting gas from the second reservoir, the inerting gas is heated to a higher temperature level.

Inerting gas generated is preferably admixed with a catalytic aerosol as a suspension or powder. The catalytic aerosol is particularly suitable for triggering oxidation of hydrogen gas at room temperature. The catalytic aerosol may permit effective oxidation of the hydrogen both in suspended form or as a deposit inside the containment shell, and is thus effective both short term and long term.

In accordance with a further feature of the invention, the inert gas is introduced, following its vaporization, as an inerting gas into a container which contains hydrogen gas, so that the hydrogen gas concentration is reduced in order to render the container completely inert or in order to convert hydrogen gas in a controlled manner. The inerting gas likewise effects a reduction in the concentration of oxygen, so that the risk of the formation of an explosive gas mixture comprising hydrogen and oxygen is effectively prevented. In the case of partial inerting, safe catalytic conversion of the hydrogen is provided, for example, via recombiners. Before feeding the inerting gas into the container, the pressure may be relieved by means of a restrictor or a valve in order to dry the inerting gas and to control the pressure.

With the above and other objects in view there is also provided, in accordance with the invention, an apparatus for generating the inerting gas. The apparatus comprises:

a) a first reservoir storing liquid phase or solid phase inert gas;

b) a second reservoir storing a heat transfer medium at a temperature of above 100° C.; and c) a connecting line between the first second reservoirs, the connecting line being normally closed such that the inert gas is thermally isolated from the heat transfer medium, and there are provided means for selectively opening the connecting line such that the inert gas can be brought into thermal contact with the heat transfer medium for vaporizing the inert gas.

In other words, there is provided an apparatus for generating an inerting gas for feeding into a container, in particular into a containment shell of a nuclear power plant, having a first reservoir for storing liquefied or solidified inert gas, having a second reservoir for making available a heat transfer medium at a temperature of above 100° C., and having a connection, which is normally closed and ensures that the liquefied or solidified inert gas is thermally isolated from the heat transfer medium, and which is open when required, so that the inert gas can be brought into thermal contact with the heat transfer medium. The apparatus can be of particularly compact design, it being possible to reduce the volume of the second reservoir to about 50% of the volume of the first reservoir. This is the case in particular for a second reservoir which is filled with water as the heat transfer medium and from which the water is sprayed into the first reservoir, resulting in direct vaporization of the liquefied or solidified inert gas. In this case, partial utilization of the enthalpy of fusion can contribute to the vaporization of the inert gas even at temperatures below the freezing point of water. The apparatus is thus particularly suitable for generating large amounts of inerting gas, and thus for subsequently inerting, in particular both for partially inerting and also for completely inerting, a containment shell of a nuclear power plant. It can also be retrofitted with little technical and financial expenditure.

A further reduction in the space required by an apparatus is achieved by disposing the first reservoir and the second reservoir vertically above one another. As a result, additional lines are dispensed with, the connection between the first reservoir and the second reservoir can be kept particularly short, and the first reservoir and the second reservoir are surrounded by a single insulation, which likewise insulates the reservoirs horizontally with respect to one another.

Preferably, there is a fluid flow of the liquefied inert gas into the second reservoir or a fluid flow of a liquid heat transfer medium into the first reservoir as a result of a higher pressure in the first reservoir or the second reservoir. The inert gas or the heat transfer medium is consequently led into the respectively other reservoir as a result of a pressure difference between the first reservoir and the second reservoir. For example, the first reservoir is at a pressure of 20 bar and the second reservoir at a pressure of 40 bar. The pressure difference between the two reservoirs is in particular 2 bar to 10 bar. The inert gas is mixed with the heat transfer medium via nozzles with a spraying speed of more than 10 m/sec., in particular about 30 m/sec. to 50 m/sec. The pressure formed by the vaporizing inert gas is controlled, for example, via a restrictor or a control valve in the connection between the two reservoirs. The maximum fluid flow through the connection is limited by a restrictor, as a result of which explosive formation of gas is reliably avoided. By applying additional pressure, for example by introducing pressurized nitrogen, the pressure difference between the two reservoirs can be maintained until the liquefied or solidified inert gas has been predominantly vaporized. The inerting gas generated by vaporizing the liquefied or solidified inert gas is preferably led into a containment shell at a pressure of between 5 bar and 10 bar. As a result, it is possible, for example, to use existing lines and passages of a containment shell of a nuclear power plant for feeding in the inerting gas.

The second reservoir preferably has a super-heater, in which vaporized inert gas can be additionally heated. To this end, vaporized inert gas, i.e. the inerting gas, is led out of the second reservoir and, via a separate line, back into the superheater, from where the inerting gas is led into a vapor region present above the level of the heat transfer medium. The vapor region, which is filled with vaporized inert gas, the inerting gas, is as a result heated further and the inerting gas is subjected to an additional increase in pressure.

In accordance with an added feature of the invention, there is provided a device for feeding a catalytic aerosol, for example in the form of a suspension or a powder, into vaporized inert gas. That feed device is preferably outside the reservoirs, in particular connected to a line provided for conducting the inerting gas. The aerosol is fed into a stream of the inerting gas via a corresponding nozzle, in particular via a Venturi tube.

In accordance with an additional feature of the invention, the second reservoir is a heating container of a venting device of a nuclear power plant. The second reservoir thus represents a high-temperature energy store for a venting scrubbing liquid at a temperature of, for example, over 90° C. This high-temperature energy store can easily be provided with a spraying device, also during a retrofit, so that liquefied or solidified inert gas can be introduced into the high-temperature energy store via this spraying device. By means of an additional line, which can be arranged in particular in an upper region of the high-temperature energy store, in the event of a fault vaporized inert gas can be introduced into a containment shell of a nuclear power plant via existing lines or line systems. Minor structural measures and the provision of a first reservoir containing liquefied or solidified inert gas thus mean that an apparatus for generating a large amount of inerting gas is provided with a low degree of expenditure. This apparatus is particularly suitable as an addition to an existing venting device of a nuclear power plant, making it possible to render inert and to vent the atmosphere of the containment shell.

In accordance with a concomitant feature of the invention, the apparatus for generating inerting gas can likewise be arranged inside a containment shell of a nuclear power plant without great technical effort. Compared with known apparatuses for generating an inerting gas, this results in no impairment to the safety of the containment shell, since, in particular, no combustible substances of any kind are required for operating the apparatus. Also, the containment shell itself remains closed.

Other features which are considered as characteristic for the invention are set forth in the appended claims.

Although the invention is illustrated and described herein as embodied in a process and an apparatus for generating an inerting gas, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
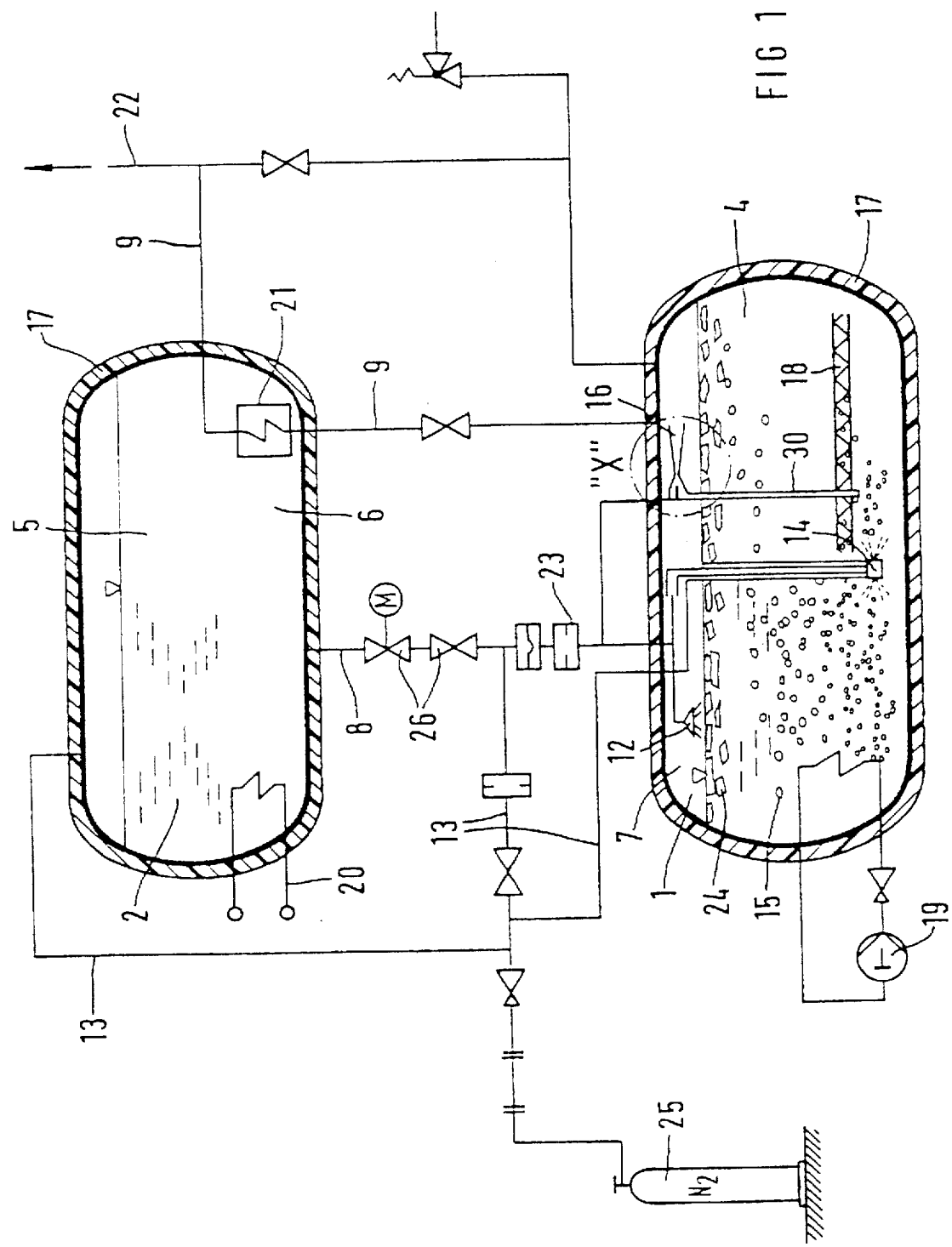
FIG. 1 is a diagrammatic view of the essential components of a first embodiment of the system, in which the heat transfer medium is fed into liquefied inert gas.

Referring now to the figures of the drawing in detail and first, particularly, to FIG. 1 thereof, there is seen a second reservoir 5, which is filled with a heat transfer medium 2, in particular water. The second reservoir 5 has a heating system 20 and is surrounded by an insulation 17. A superheater 21 is arranged in a lower region 6 of the second reservoir 5. The super-heater 21 is connected, via a superheater line 9, to a first reservoir 4, which is partly filled with liquefied inert gas 1. In addition, the superheater 21 is connected to a gas line 22, which leads to a non-illustrated container. The gas line 22 is in turn connected to the first reservoir 4. The second reservoir 5 is connected to the first reservoir 4 via a connection line 8, through which the water of the second reservoir 5 can be led into the first reservoir 4. The connection line 8 can be closed off by means of a valve 26, in particular a motor-operated or external medium-operated valve. Furthermore, a restrictor 23, for the purpose of restricting a fluid flow, is disposed in the connection line 8. The first reservoir 4 is likewise surrounded by an insulation 17 and has a refrigerating installation 19 with a pump. The connection line 8 opens into various feed devices inside the first reservoir 4. These devices are a spray nozzle 12, which is arranged in a gas space 7 above the liquefied inert gas, a mixing nozzle 16, a mixing element 18, which is arranged inside the liquefied inert gas 1, and a feed nozzle 14, which is likewise situated inside the liquefied inert gas 1. The mixing nozzle 16 has a feed line, which likewise projects into the liquefied inert gas 1. A pressure vessel 25 for a blanket gas (protective, inert gas), for example nitrogen, is also shown. The vessel 25 communicates via a nitrogen feed line 13 with both the first reservoir 4 and the second reservoir 5. When the valve 26 is opened, for example as a result of a fault incident in the non-illustrated container, hot water, for example at a temperature of 150° C., flows into the first reservoir 4. The flow of the hot water is driven by pressure, as a result of a higher pressure inside the second reservoir 5 compared with a lower pressure inside the first reservoir 4, the pressure difference being, for example, in a range from 2–10 bar (0.2–1 MPa). In order to introduce the water essentially completely into the first reservoir 4, a feed of blanket gas from the blanket gas pressure vessel 25 via the feed line 13 is provided in order to preserve the pressure difference. A flow of the hot water into the first reservoir 4 is controlled via the restrictor 23, so that excessive vaporization of the liquefied inert gas 1, i.e. a vapor explosion, is avoided. The hot water is introduced directly into the liquefied inert gas 1 via the feed nozzle 14 and the mixing element 18, as a result of which gas bubbles 15, which rise into the gas space 7, are formed by direct vaporization of the liquefied inert gas 1. Freezing water likewise rises in the direction of the gas space 7, as pieces of ice 24. The hot water is mixed directly with the liquefied inert gas 1 in the mixing nozzle 16, and the liquefied inert gas 1 is thus directly vaporized, accompanied by a buildup of pressure inside the gas space 7. The vaporized inert gas 1 is compressed and its pressure increased in the gas space 7. The inert gas can thus introduced at high speed into the non-illustrated container via the gas line 22. Feeding the hot water into the first reservoir 4, which contains the liquefied inert gas 1 at a temperature of below −10° C., makes it possible to ensure vaporization of large amounts of the inert gas, e.g. about 10,000 kg/h, and thus the generation of large amounts of inerting gas.

Figure 2:
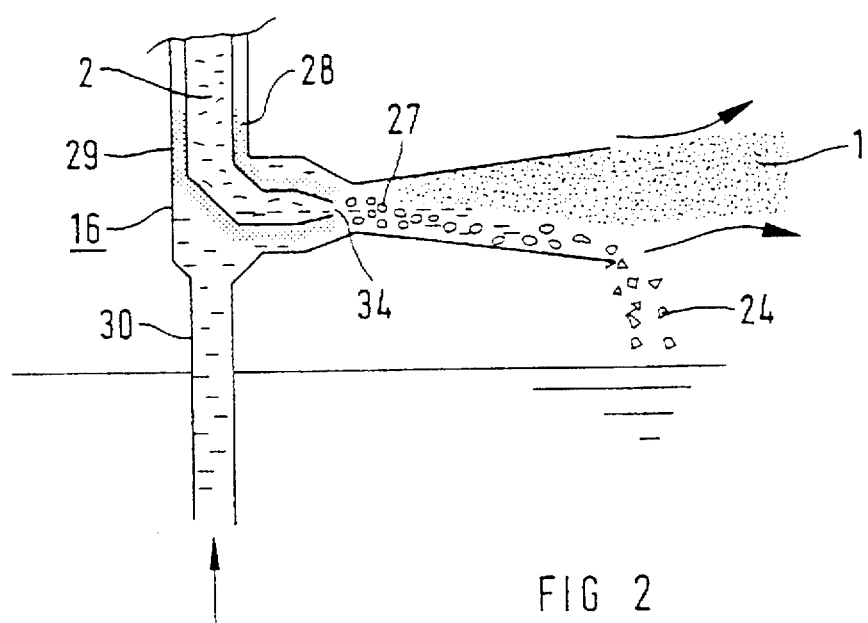
FIG. 2 is a partial, longitudinal section of a feed nozzle of FIG. 1.

FIG. 2 shows the mixing nozzle 16 of FIG. 1 on an enlarged scale (detail "X"). The mixing nozzle 16 has a feed line 30 for liquefied inert gas 1. A double tube 29, in the inner tube of which the heat transfer medium, i.e. the hot water, is guided, opens into the feed line 30. Blanket gas, in particular nitrogen, is guided in the outer tube of the double tube 29. The hot water, the blanket gas 28 and the liquefied inert gas 1 impinge on one another at the orifice 34 of the double tube 29. As a result, the inerting gas is formed by direct vaporization of the liquefied inert gas 1 and a large number of pieces of ice 24 are formed due to the water freezing. The orifice 34 is protected against freezing by means of the blanket gas 28. A conical widening of the mixing nozzle 16 downstream of the orifice 34 brings about high-speed mixing and distribution of the liquefied inert gas 1 with the hot water. As a result, the liquefied inert gas is vaporized in a particularly effective manner.

Figure 3:
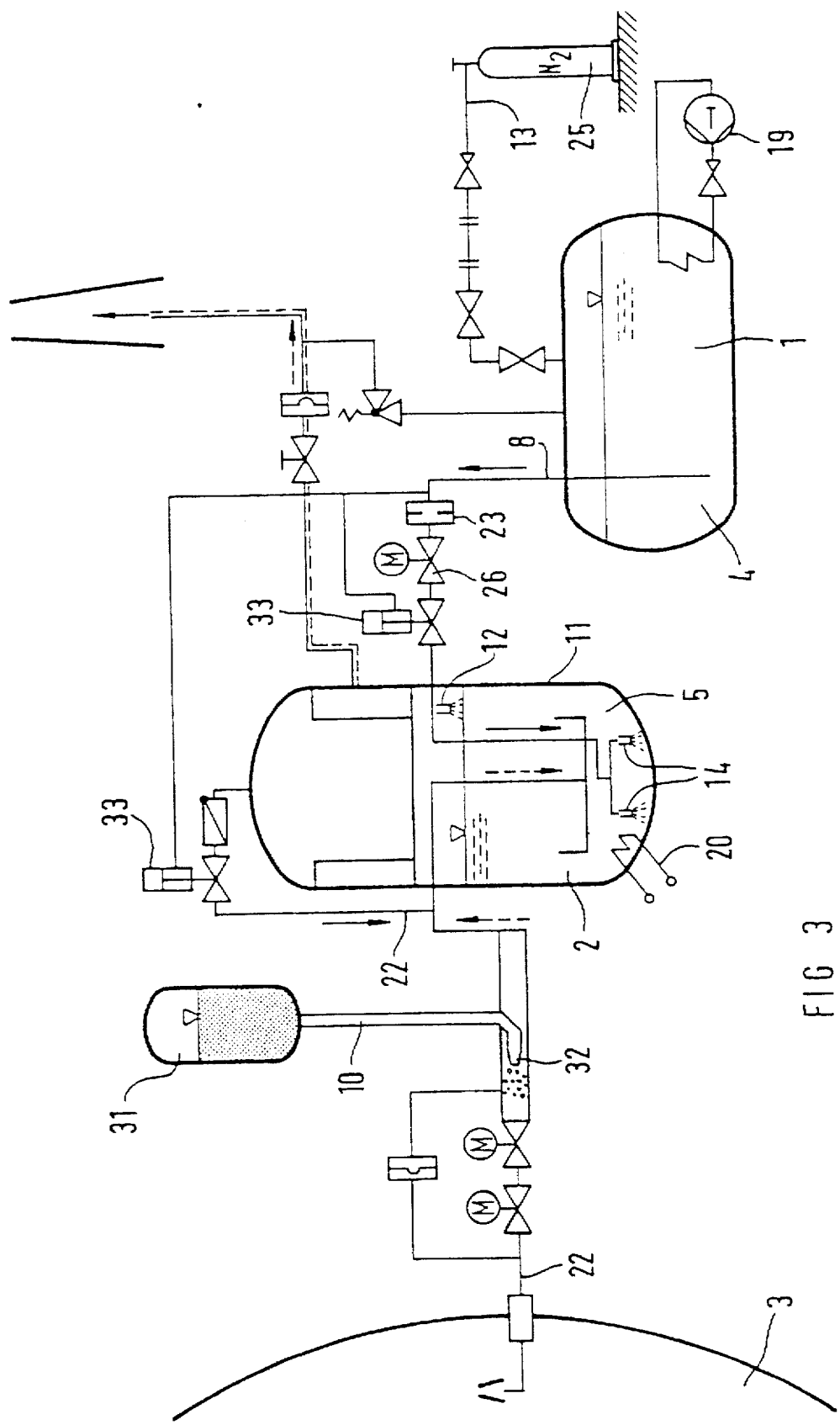
FIG. 3 is diagram of a second embodiment of the system, with a high-temperature energy store of a venting device.

Referring now more specifically to the diagrammatic illustration of FIG. 3, the apparatus for generating an inerting gas has a first reservoir 4, a second reservoir 5, a device 10 for feeding aerosol and a containment shell 3 of a nuclear power plant. The second reservoir 5 is a high-temperature energy store 11 of a venting device for circulating the atmosphere of the containment shell 3. The high-temperature energy store 11 has a heating system 20 and is partially filled with a heat transfer medium 2, in particular water at a temperature of about 100° C. and a pressure of <10 bar ($10^6$ Pa). Liquefied inert gas 1 is situated in the first reservoir 4. It is cooled by means of a refrigerating installation 19, for example to a temperature of below −10° C. In order to maintain or increase the pressure inside the first reservoir 4, the latter is connected, via a feed line 13, to a pressure vessel 25 for a blanket gas, in particular nitrogen. The first reservoir 4 is connected via a connection line 8 to the high-temperature energy store 11. The connection line 8 contains feed nozzles 14 and spray nozzles 12 in the interior of the high-temperature energy store 11. Vaporized inert gas 1 can be guided out of the high-temperature energy store 11, via a gas line 22, and led into the containment shell 3. It is thereby possible to use existing lines of the high-temperature energy store 11 into the containment shell 3 for the gas line 22. A valve 33, which can be actuated using its own separate medium, is in each case arranged in the gas line 22 and the connection line 8, as a result of which feeding the liquefied inert gas 1 into the high-temperature energy store 11 and from the latter into the containment shell 3 can be controlled. A device 10 for feeding aerosol can be inserted into the gas line 22, which device has a reservoir 31 for an aerosol suspension and a nozzle 32 for feeding the aerosol into the vaporized inert gas. An apparatus of this kind can be included in an existing venting system without major structural measures in order to generate large amounts of an inerting gas, making it possible to feed the inerting gas directly into the containment shell 3 via the venting system.

Figure 4:
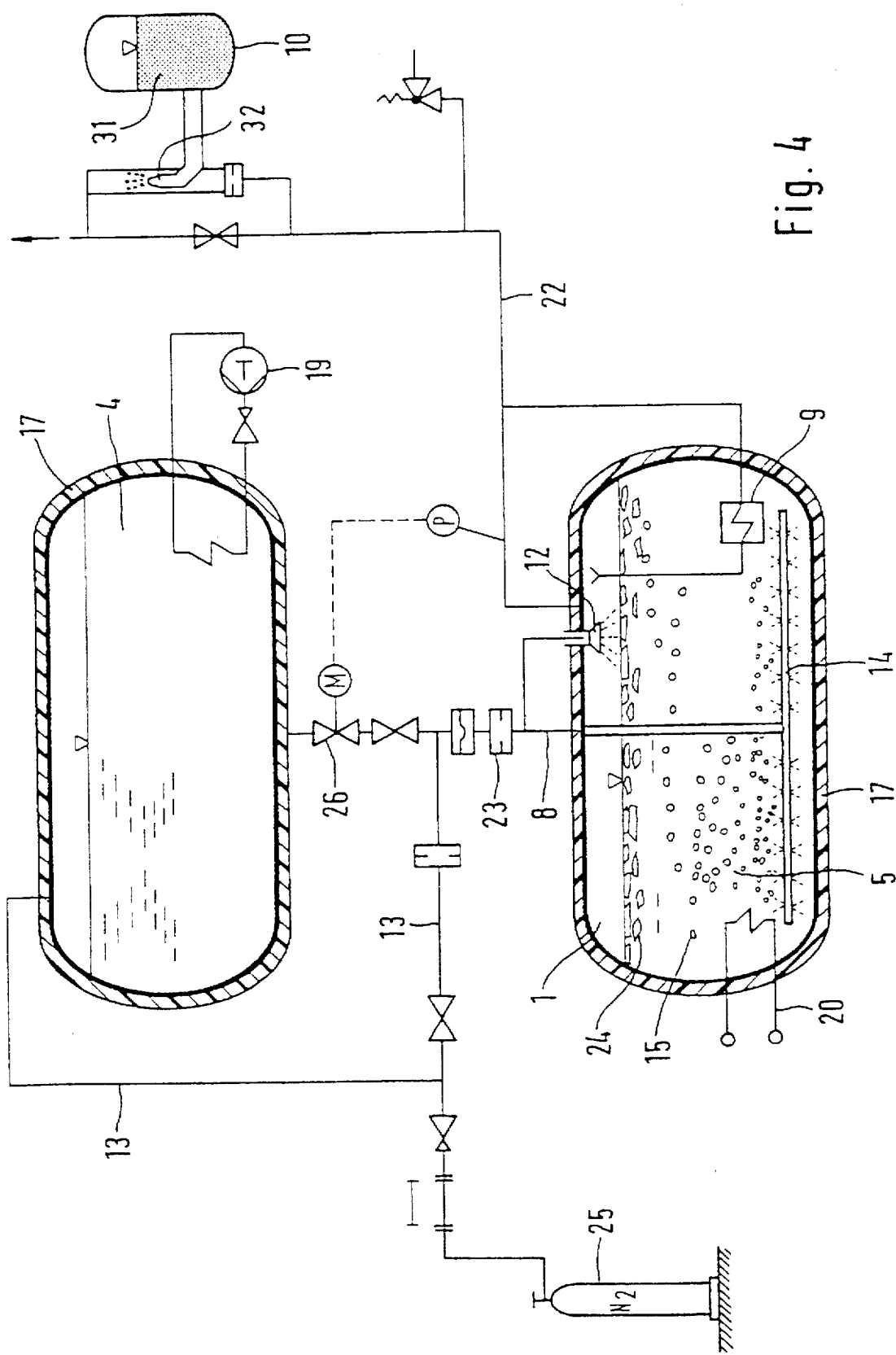
FIG. 4 is a similar view of a third embodiment of the system, in which liquefied inert gas is fed into a heat transfer medium.

FIG. 4 represents a further embodiment of the novel system for generating an inerting gas. Liquid carbon dioxide is kept at a temperature of below −10° C. in a first reservoir 4 and is fed through a connection line 8 into a second reservoir 5, which contains hot water at over 100° C. Analogously to FIG. 1, a pressure vessel 25 for a blanket gas with a corresponding feed line 13 is shown for the purpose of maintaining a pressure difference between the first reservoir 4 and the second reservoir 5. The second reservoir 5 has a gas line 22 for removing vaporized inert gas 1, in which line, analogously to FIG. 3, a device 10 for feeding in aerosol is shown. The liquefied inert gas 1 is fed into the second reservoir 5 via a spray nozzle 12 and a feed nozzle 14 arranged in the hot water. For heating the vaporized inert gas 1 further and increasing its pressure, the second reservoir 5 contains a superheater 9, which is connected to the gas line 22. This apparatus also makes it possible to blast solidified inert gas, for example in the form of a particle jet of finely divided ice particles, into the hot water. As a result, the inerting gas is likewise formed due to direct vaporization. Further features and the reference numerals correspond to those of FIG. 1 and of FIG. 2.

Figure 5:
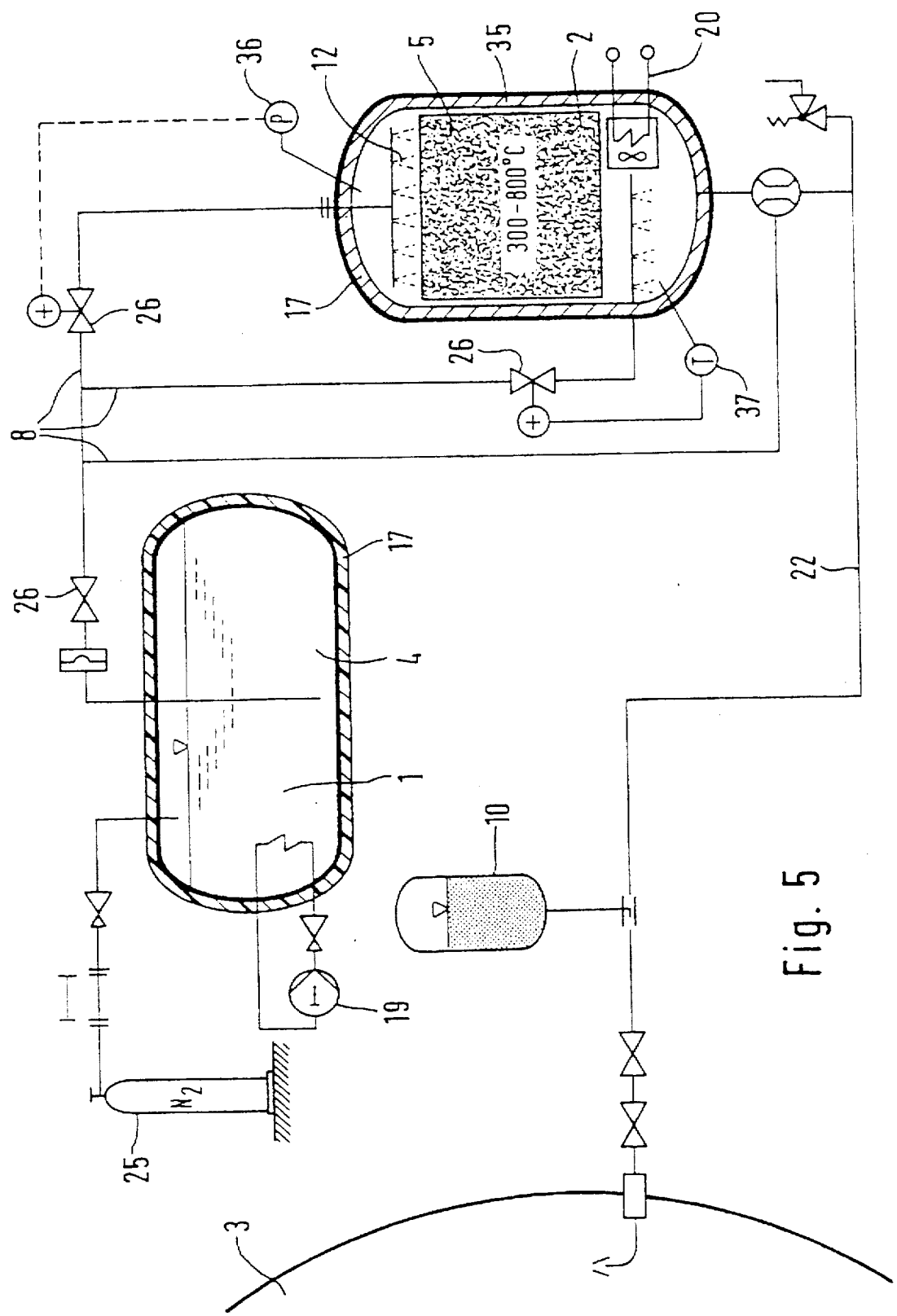
FIG. 5 is a similar view of a fourth embodiment of the system, with a solid heat transfer medium.

FIG. 5 is a diagrammatic representation of a fourth embodiment of the apparatus with a first reservoir 4, which contains a liquefied inert gas 1, for example carbon dioxide or nitrogen, and a second reservoir 5, which contains a solid heat transfer medium 2. Details of FIG. 5 which are not explained in more detail, such as for example a containment shell 3, a device 10 for feeding in aerosol, a refrigerating installation 19 and liquid feed devices correspond to those of FIGS. 1 to 4. The reference numerals for FIG. 5 accordingly correspond to those of FIGS. 1–4. The first reservoir 4 is connected to the second reservoir 5 via a connection line 8. The connection line 8 is divided into three branches, one branch ending in spray nozzles 12 inside the second reservoir 5, through which nozzles liquefied inert gas 1 is sprayed directly onto the solid heat transfer medium 2. This solid heat transfer medium 2 is at a temperature of about 300° C. to 800° C. Due to the high temperature difference between the liquefied inert gas 1 and the solid heat transfer medium 2, the inerting gas formed by direct vaporization is likewise at a high temperature in a lower region 6 of the second reservoir 5. Liquefied inert gas 1 is additionally fed into this inerting gas via a further branch of the connection line 8, via spray nozzles 12, as a result of which inert gas 1 is vaporized further. In addition, this additional feed of liquefied inert gas 1 increases the vaporization rate. The amount of liquefied inert gas 1 which is supplied is controlled via corresponding valves 26 in the branches of the connection line 8. These valves 26 are controlled via a pressure measuring point 36 or a temperature measuring point 37. The second reservoir 5 is connected via a gas line 22 to a containment shell 3 of a nuclear power plant. Inerting gas, which is at a temperature of about 50° C., leaving the second reservoir 5 is introduced through the gas line 22. An additional feed of liquefied inert gas 1 into the gas line 22 may take place via an additional branch of the connection line 8, resulting in a further increase in the vaporization rate. The second reservoir 5 has an internal insulation 35, which is used to reduce the wall temperature of the second reservoir, on its inside, as a result of which the mechanical stressing of the second reservoir is reduced and the latter can be constructed with a small wall thickness.

Figure 6:
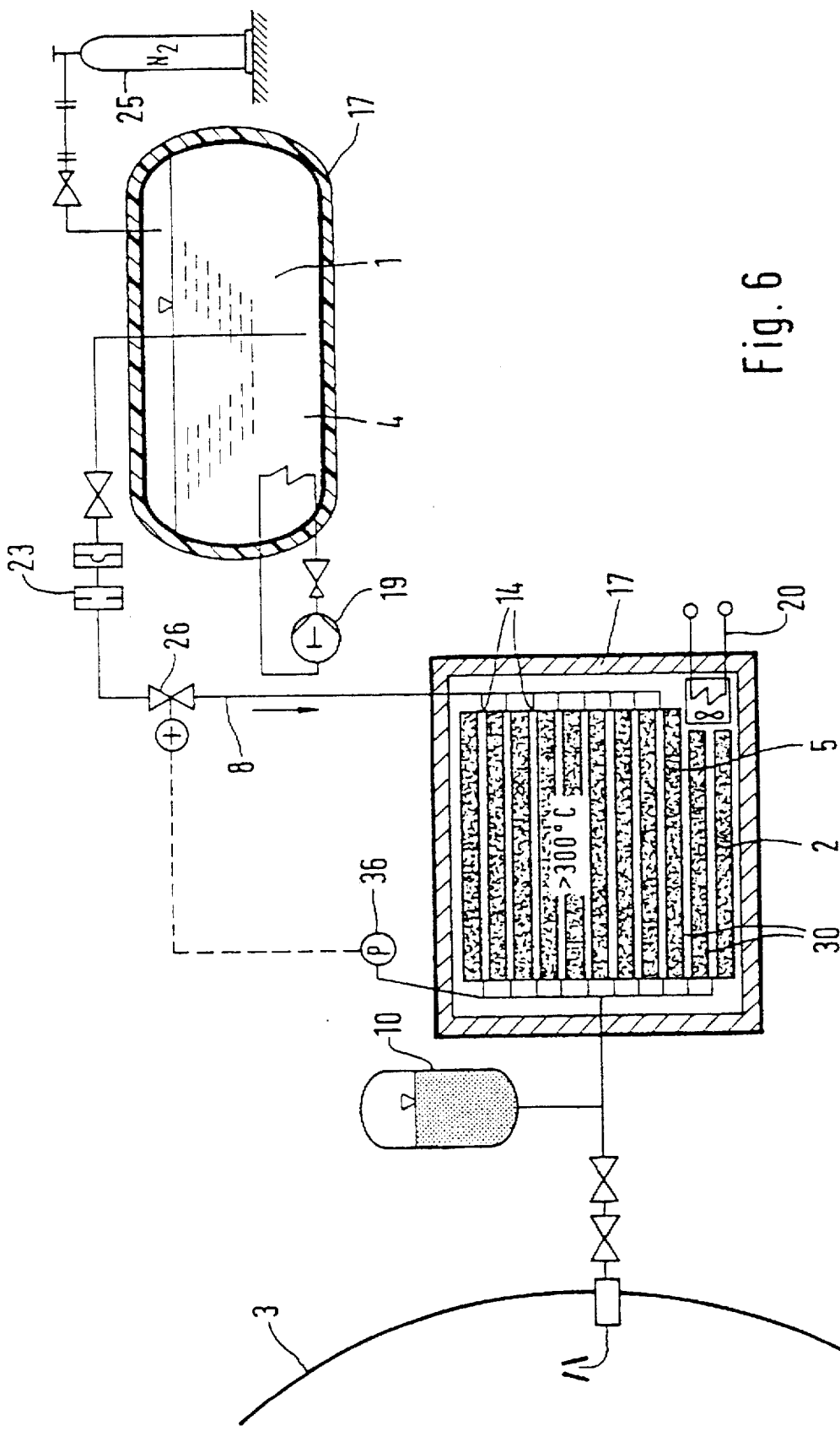
FIG. 6 is a similar view of a fifth embodiment of the system, with flow channels through a solid heat transfer medium.

Analogously to FIG. 5, FIG. 6 represents a fifth embodiment of the apparatus, having a solid heat transfer medium 2. The reference numerals and details not explained in more detail correspond to those of FIG. 1 to FIG. 5. The second reservoir 5 contains, as shown in FIG. 5, a heating system 20, which also ensures that the temperature inside the second reservoir 5 is made even. The solid heat transfer medium 2 is designed as a monolithic block, through which channels 30 pass. The liquefied inert gas is sprayed into these channels 30 in a gastight manner via feed nozzles 14, in particular in the manner of a Venturi tube. After passing through the channels 30, the vaporized inert gas, the inerting gas, is collected from the block in a gastight manner in a gas line 22 and is fed to a containment shell 3 of a nuclear power plant. The amount of liquefied inert gas 1 flowing through the connection line 8 is regulated via a valve 26, which is controlled by means of a pressure measuring point 36 arranged inside the second reservoir 5. A device 10 feeds in a catalytic aerosol or additional liquefied inert gas 1. Liquefied inert gas additionally fed into the gas line 22 is vaporized therein and contributes to increasing the vaporization rate.

The process is distinguished by its passive operation and by the generation of a large amount of inerting gas, so that the atmosphere of a containment shell of a nuclear power plant, in particular with a pressurized-water reactor, can be completely or partially rendered inert within a short time. In the case of partial inerting, hydrogen contained in the atmosphere of the containment shell can be safely converted catalytically by using recombiners. In any case, subsequent inerting of the containment shell in the event of a fault is thus ensured, so that the formation of an explosive mixture of hydrogen and oxygen is reliably avoided. The apparatus is distinguished by its particularly compact design, it being possible to integrate existing devices of a nuclear power plant, such as for example a venting device with a high-temperature energy store and lines. The apparatus can easily be retrofitted without great technical outlay. It can likewise be arranged inside the containment shell of a nuclear power plant.

I claim:
1. A process for generating an inerting gas, which comprises:
storing a liquid or solid phase inert gas in a first reservoir;
maintaining a sufficient amount of heat for vaporizing the liquid or solid phase inert gas in a heat transfer medium in a second reservoir at a temperature of above 100° C.; and
bringing the heat transfer medium and the liquid or solid phase inert gas into thermal contact with one another, for vaporizing the liquid or solid phase inert gas and generating an inerting gas.

2. The process according to claim 1, wherein the heat transfer medium is a liquid heat transfer medium and the step of maintaining comprises storing the heat transfer medium in the second reservoir at a temperature of between 150° C. and 250° C.

3. The process according to claim 2, wherein the liquid heat transfer medium is one of water and oil.

4. The process according to claim 1, wherein the heat transfer medium is a solid-phase heat transfer medium and the step of maintaining comprises storing the heat transfer medium in the second reservoir at a temperature of between 300° C. and 800° C.

5. The process according to claim 1, which further comprises feeding the inerting gas generated in the bringing step into a containment of a nuclear power plant.

6. The process according to claim 1, which comprises using at least one of carbon dioxide and nitrogen as the inert gas.

7. The process according to claim 1, wherein the bringing step comprises introducing solidified inert gas in finely divided form into the liquid heat transfer medium.

8. The process according to claim 1, wherein the heat transfer material is a solid heat transfer medium selected from the group consisting of metal and ceramic.

9. The process according to claim 8, wherein the bringing step comprises pouring the solid heat transfer medium in pourable form.

10. The process according to claim 9, wherein the pourable solid heat transfer medium is one of bulk material and a pebble bed.

11. The process according to claim 1, which comprises pressurizing at least one of the first and second reservoirs to a pressure of between 5 and 50 bar.

12. The process according to claim 11, wherein the pressurizing step comprises pressurizing to approximately 20 bar.

13. The process according to claim 1, which comprises maintaining the first reservoir at a temperature of below −10° C.

14. The process according to claim 1, which comprises heating the inert gas to a temperature of above −20° C.

15. The process according to claim 14, which comprises heating the inert gas to a temperature of above −10° C.

16. The process according to claim 1, which comprises introducing the heat transfer medium in liquid form into liquefied inert gas.

17. The process according to claim 16, wherein the introducing step comprises introducing the liquid heat transfer medium in finely divided form.

18. The process according to claim 16, wherein the introducing step comprises introducing the liquid heat transfer medium at a speed of over 10 m/s.

19. The process according to claim 1, which comprises spraying the inert gas in liquefied form into the heat transfer medium.

20. The process according to claim 19, wherein the spraying step comprises spraying the inert gas into the heat transfer medium in finely divided form.

21. The process according to claim 19, wherein the spraying step comprises spraying the inert gas into the heat transfer medium at a speed of over 10 m/s.

22. The process according to claim 1, which comprises, after vaporization of the inert gas, admixing to the vaporized inert gas a catalytic aerosol suitable for triggering oxidation of hydrogen gas at room temperature.

23. The process according to claim 22, wherein the admixing step comprises admixing the catalytic aerosol in the form of one of a suspension and a powder.

24. The process according to claim 1, which comprises, after vaporization of the inert gas, introducing the inerting gas into a container with hydrogen gas, and reducing the hydrogen gas concentration for rendering the container completely inert or for converting the hydrogen gas in a controlled manner.

25. An apparatus for generating an inerting gas, comprising:
   a) a first reservoir storing liquid phase or solid phase inert gas;
   b) a second reservoir storing a heat transfer medium at a temperature of above 100° C.; and
   c) a connecting line between said first reservoir and said second reservoir, said connecting line being normally closed such that said inert gas is thermally isolated from said heat transfer medium, and having means for selectively opening said connecting line such that said inert gas can be brought into thermal contact with said heat transfer medium for vaporizing said inert gas.

26. The apparatus according to claim 25, which comprises a further connecting line for feeding the inerting gas into a containment shell of a nuclear power plant.

27. The apparatus according to claim 25, wherein said inert gas is liquefied inert gas and said heat transfer medium is a liquid heat transfer medium, and wherein said first reservoir is subjected to relatively higher pressure than said second reservoir such that, when said connecting line is open, a pressure-driven flow of said liquefied inert gas to said a liquid heat transfer medium is established.

28. The apparatus according to claim 25, wherein said inert gas is liquefied inert gas and said heat transfer medium is a liquid heat transfer medium, and wherein said second reservoir is subjected to relatively higher pressure than said first reservoir such that, when said connecting line is open, a pressure-driven flow of said liquid heat transfer medium to said liquefied inert gas is established.

29. The apparatus according to claim 25, which further comprises a superheater disposed in said second reservoir, for heating vaporized inert gas.

30. The apparatus according to claim 25, which further comprises a device for feeding a catalytic aerosol into the vaporized inert gas.

31. The apparatus according to claim 30, wherein the catalytic aerosol is a suspension or a powder.

32. The apparatus according to claim 25, wherein said second reservoir is a heating container of a venting device of a nuclear power plant.

33. The apparatus according to claim 25, wherein said first and second reservoirs and said connecting line are disposed inside a containment shell of a nuclear power plant.

* * * * *